Aug. 14, 1962 P. W. JOHNSON 3,048,926
WHEEL GAGE
Filed Aug. 20, 1958 2 Sheets-Sheet 1
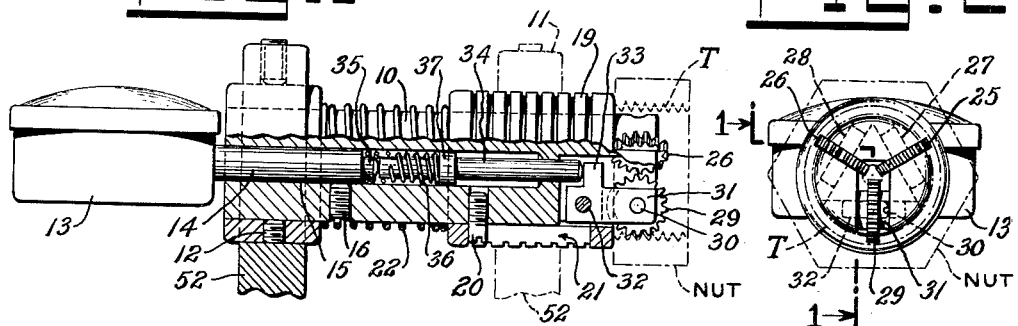
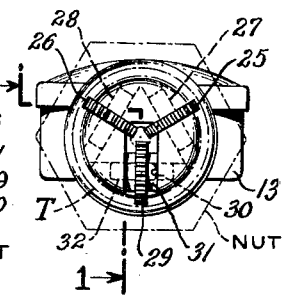
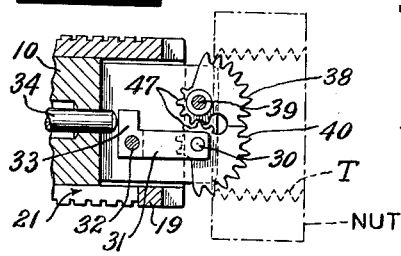
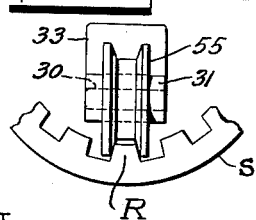
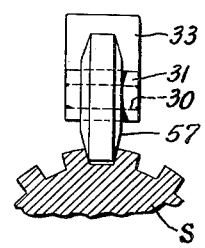
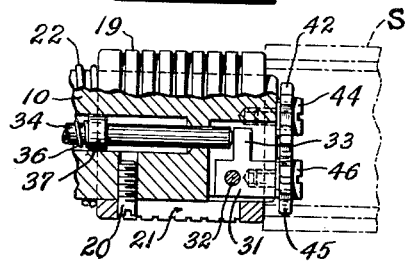
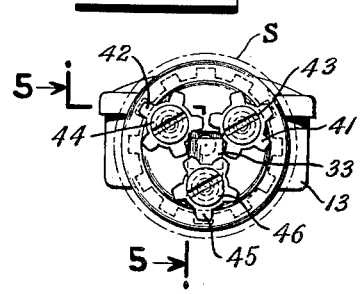
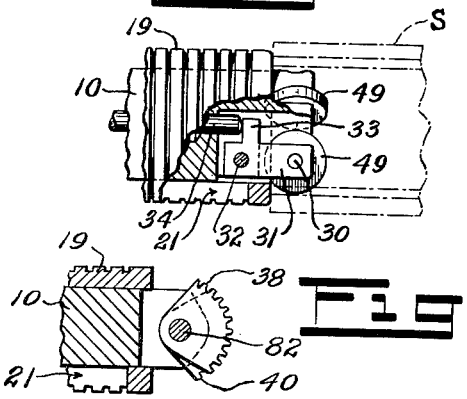
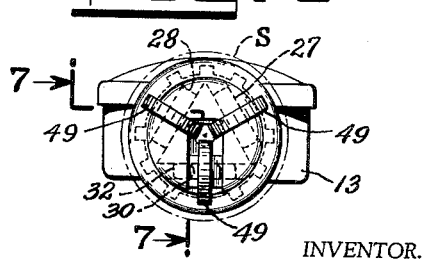
INVENTOR.
PAUL W. JOHNSON
BY
Bohleber, Jasett & Montstream
ATTORNEYS Aug. 14, 1962 P. W. JOHNSON 3,048,926
WHEEL GAGE
Filed Aug. 20, 1958 2 Sheets-Sheet 2
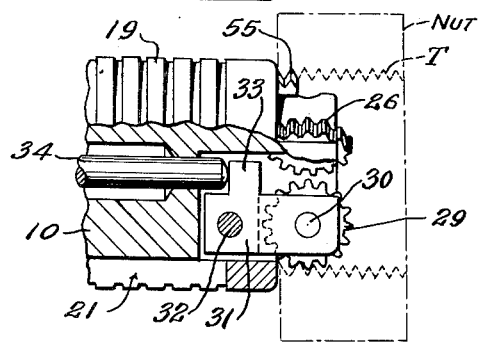
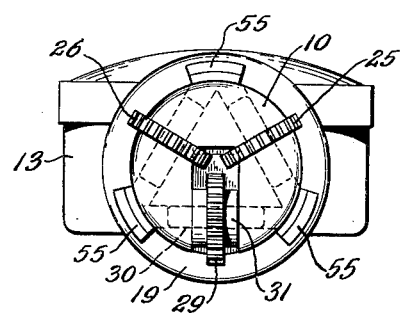
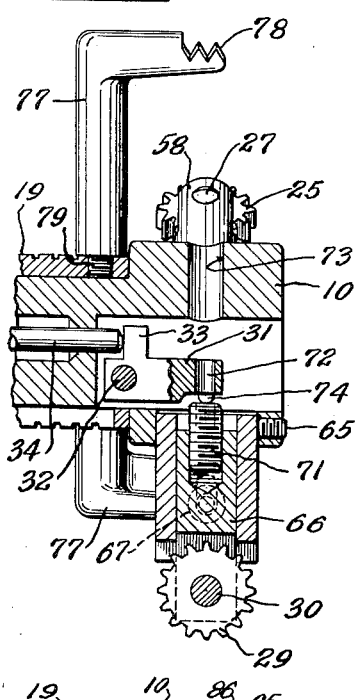
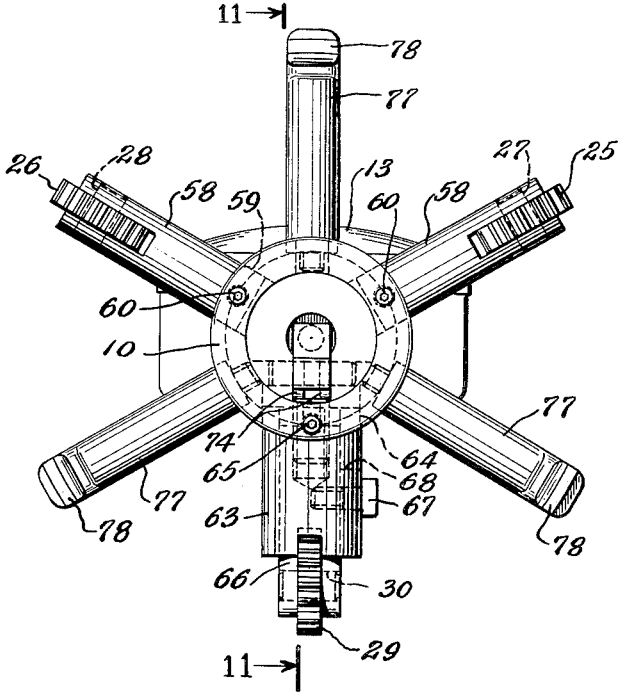
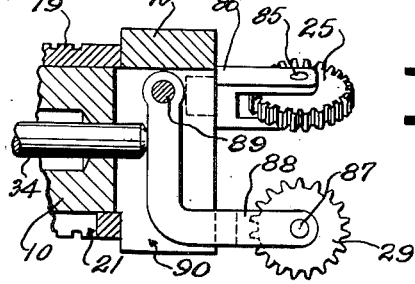
INVENTOR.
PAUL W. JOHNSON
BY
Bohleber, Fasett & Montstream
ATTORNEYS United States Patent Office 3,048,926
Patented Aug. 14, 1962

3,048,926
WHEEL GAGE
Paul W. Johnson, Bloomfield, Conn., assignor to The Johnson Gage Development Company, Bloomfield, Conn., a corporation of Connecticut
Filed Aug. 20, 1958, Ser. No. 756,187
22 Claims. (Cl. 33—178)

The invention relates to a wheel gage for testing an internal and an external surface. The surface may be grooved such as with an internal thread, or with external or internal splines. The surface may be the bottom of a spline groove or the form of a spline groove, a plain surface, and the like. The gage will test for the accuracy of various forms of grooves. The gage may be mounted on a stand for testing parts which can be brought to the gage or may be a hand gage which is brought to the work for example the testing of screw threads in a hole carried by a heavy casting.

It is an object of the invention to construct a simple wheel gage for testing the accuracy of various forms of surfaces or ribs.

Another object of the invention is to construct a wheel gage for testing the accuracy of an internal screw thread.

Another object of the invention is to construct a wheel gage to test the accuracy of the longitudinal extending ribs or ridges such as in splines.

Another object is to construct a wheel gage which will test the accuracy of the maximum diameter of the grooves of an internal spline or the root dimension or minimum dimension of an external spline.

Other objects of the invention will be more apparent from the following description when taken in connection with the accompanying drawings illustrating preferred embodiments thereof in which:

FIG. 1 is a partial section taken on line 1—1 of FIG. 2 through an internal wheel gage for testing the accuracy of an internal thread;

FIG. 2 is an end view of the gage of FIG. 1;

FIG. 3 is a partial view of a gage in section with gaging wheels which are a section of a full wheel;

FIG. 4 is a partial view of a gaging wheel which tests the accuracy of longitudinally extending ridges such as of a spline;

FIG. 4a is a view of the form of gaging wheel for gaging external spline grooves;

FIG. 5 is a partial view in section taken on line 5—5 of FIG. 6 of a wheel gage for testing the accuracy of the splines of an internal spline member;

FIG. 6 is an end view of the wheel gage of FIG. 5;

FIG. 7 is a partial view partially in section taken on line 7—7 of FIG. 8 of a wheel gage for testing a maximum diameter of the root or a spline;

FIG. 8 is an end view of the gage of FIG. 7;

FIG. 9 is a partial view of the gage of FIG. 1 with additional structure;

FIG. 10 is an end view of FIG. 9;

FIG. 11 is a partial view and in section taken on line 11—11 of FIG. 12 of a gage modified for large diameter surfaces;

FIG. 12 is an end view of the gage of FIG. 11;

FIG. 13 is a partial view of a single pivot gage; and

FIG. 14 is a partial view of an external gage.

In the testing of internal surfaces it is customary to use a solid plug and pass it into the hole to be gaged. For an internal screw thread such solid screw plug must be threaded into the threaded hole which is time-consuming and also results in increased wear at the starting threads which shortens the life of the thread testing plug. In another construction a contractible and expandible plug is used which is collapsed so that the plug can be inserted axially into the threaded hole after which the plug is expanded to contact the thread ridges or grooves to gage and an indicator indicates the accuracy of the thread or groove or its deviation from a perfect thread. Such contractible plug gage is rapid in use as compared with a solid plug gage. For the gaging of splines a solid master plug or plugs or various other forms of gages are used which have their limitations. With the wheel gage to be described, an indication of the accuracy of the internal surface is secured throughout the length thereof.

The gage includes a frame member 10 which may have a collar 11. The collar shown is a separate part secured to the frame member such as by screw 12. An indicator shown as a dial indicator 13 is carried by the end of the frame member in any suitable fashion, the more convenient construction being to insert the stem 14 of the indicator into a bore 15 in the frame member and to secure the stem and indicator at the end of the frame member by a screw 16.

A sleeve member 19 may be mounted on the frame member for axial movement thereon or vice-versa as will appear. Preferably the sleeve member is slidable on the frame member and held against rotation by a screw 20 threaded into the frame member and the sleeve member having a slot 21 which receives the end of the screw. A spring 22 may be provided, if desired, between the end of the collar 11 and the end of the sleeve 19 in order to propel the sleeve or frame member relatively to the other.

Gaging wheels are rotatably mounted on the end of the frame member. The gaging wheels include gaging wheel means which includes at least one gaging wheel. The gaging wheel means particularly shown includes a pair of gaging wheels 25 and 26. Each wheel is mounted upon an axle 27 and 28 respectively for rotation and may be received in a slot extending inwardly from the end of the frame member. The axles may be secured in the frame member in any suitable way such as by press fitting the axles into the axle holes in the frame member or by press fitting the axles into the axle holes in the gaging wheels. Where the gaging wheel means includes a pair of gaging wheels they are spaced angularly with respect to each other, the angle of separation being less than 180°.

A cooperating gaging wheel means shown as a gaging wheel is mounted on the frame member for rotation and radial movement towards and away from the fixed gaging wheel means. In the construction illustrated the cooperating gaging wheel 29 is rotatably mounted on an axle 30 carried by an arm 31 which arm is pivotally mounted on the frame member by a pivot 32. The axle 30 is spaced from the pivot 32 so that the gaging wheel is mounted for radial movement. A suitable connection is made between the arm and the indicator that is shown including a finger or extension 33 carried by the arm which finger engages one end of a push pin 34 slidably mounted in the bore in the frame member. The other end of the push pin engages the contactor 35 of the indicator 13. Spring means may be used to pivot the cooperating gaging wheel 29 radially outwardly. The spring means particularly illustrated is a coil spring 36 around the push pin, one end of which spring engages a collar 37 on the push pin, and the other end of the spring contacts the stem of the indicator.

For gaging an internal screw thread or threads such as that within a nut, the peripheries of the gaging wheels carry gaging teeth. These teeth are formed to have rolling contact with the flanks of the thread helix and, therefore, may be generated to proper form by lapping such as with an internal thread of the same size. The teeth may be shaped in other ways. The teeth in the periphery of the gaging wheels may be short and contact at or approximately at the pitch diameter of an internal thread in which event the wheel gage tests the accuracy of the pitch diameter of the internal thread T. The teeth on the periphery of the gaging wheels may be long enough to test substantially the full flanks of the thread T in which event the internal wheel gage gages the full or substantially the full flank of the V of an internal thread T. For gaging internal grooves such as the spiral groove of a screw thread or threads, the axles of the respective gaging wheels or the axes of the axles are in a plane at right angles to the longitudinal center axis of the frame member.

It is not essential that the peripheries of the gaging wheels provide a full circle or circumference. For smaller sized internal threads it may be desirable to bring the axles closer together or relatively adjacent to each other and increase the radius of the gaging wheels over that which could be used with a full circular gaging wheel. That is the axles are closer together than two radii of the gaging wheels or elements. There is shown in FIG. 3 a gaging wheel means 38 comprising a single gaging wheel or element mounted on an axle 39 and a cooperating gaging wheel or element 40 rotatably or oscillatably mounted on axle 30 carried by the arm 31. Each gaging wheel or element is a sector of a circle and as shown approximates a quadrant which gives maximum peripheral extent with maximum rotary movement. Suitable means may keep the gaging wheels initially in starting position as shown. The means particularly shown are meshing gear teeth 47 carried by the gaging wheels which not only maintain the gaging wheels or elements in initial position but also maintain the gaging wheels rotatable together when not gaging. The gaging teeth should be free enough so that when gaging a screw thread, it is the engagement with the thread which turns or rotates each gaging wheel. The gear teeth will be a relatively loose fit so that there will be no interference with radial movement of the cooperating gaging wheel within the range of required radial movement thereof. Such gaging wheel means having a periphery of less than a full circumference may be used for gages providing three gaging wheel means.

The wheel gage may be constructed to gage the accuracy of internal or external longitudinally extending ribs or ridges in a test part such as the ridges of internal or external splines of a splined member S. For this gaging operation gaging wheel means is provided including at least one gaging wheel mounted for rotation on the frame member. In the construction particularly illustrated in FIGS. 5 and 6 the gaging wheel means includes a pair of gaging wheels 41 and 42 rotatably mounted upon axles 43 and 44 respectively. Preferably the axles are provided by screws which are threaded into the end of the frame member. If the gaging wheel means is a pair of gaging wheels as illustrated, the axes of the gaging wheels or their axles are angularly spaced from each other at an angle of less than 180°. The degree of angularity between the fixed gaging wheels for gaging a spline may vary depending upon the number of splines provided or their angular spacing in the internal hole. A cooperating wheel 45 is rotatably mounted on the arm 31 such as by an axle 46 which is located oppositely from the gaging wheel means and on a line midway between the gaging wheels of this means. The gaging wheel is spaced from the arm pivot so that the pivoting of the arm on its pivot 32 mounts the cooperating gaging wheel for radial movement with respect to the gaging wheel means 41 and 42. The rest of the construction corresponds with that of FIG. 1. The axes of the gaging wheels or the axes of the axles are parallel with the longitudinal axis of the frame member so that the gaging wheels are in the same plane. The gaging wheels as shown are spaced an equal angular distance apart, although this is not essential. For an external spline wheel gage, the gaging wheels are spaced apart to pass the spline within the gaging wheels.

The periphery of each gaging wheel is provided with gaging teeth which are of a form to engage the flanks of each longitudinally extending ridge or rib forming the spline. These teeth may be lapped into proper form such as by using an internal spline for the internal gage or an external spline for an external spline gage corresponding with that to be gaged as a lap, or they may be otherwise formed. The teeth as they rotate will engage the flanks of the spline ribs and gage their overall accuracy at the point of contact. By projecting the gaging wheels farther into the splined hole or along an external spline and again rotating the frame or the spline which will then test the accuracy of the spline ribs at this different position. In this manner the full length of the spline may be tested or gaged.

The gaging wheels of the gage of FIGS. 1 and 2 may be substituted by gaging wheels 49 as illustrated in FIGS. 7 and 8. Each of these gaging wheels has a plain or cylindrical periphery to contact and gage the root surface between spline ribs or the maximum dimension of the internal spline. The gage in other respects corresponds with that of FIGS. 1 and 2.

The internal wheel gage as illustrated in its various forms may have three different manners of use. In FIG. 1 the gage may be secured to a base 52 on the collar 11 of the frame member in which event the gage is used in the following manner. A nut whose internal threads are to be gaged is passed over the gaging wheels so that the end of the nut abuts the end of the sleeve 19. In this position, the gage tests the accuracy of the end threads of the nut. Pushing the nut against this sleeve 19, the sleeve slides upon the frame member and compresses the spring 22 and the gaging wheels rotate by contact in the thread grooves and gage the thread groove or ridge throughout the entire length of the nut. Any deviation of the thread of the nut from a master thread will shift the cooperating gaging wheel 29 radially and swing the arm on its pivot 32 and thereby shift the position of the push pin 34 whereupon the deviation may be read from the pointer on the dial of the indicator 13. The gage, therefore, will gage any inaccuracy in the thread as well as indicate whether or not the thread is tapered by a gradual increase or decrease in the indicator reading as the nut is pressed to the left or across the gaging wheels. Holding the end of the nut against the end of the sleeve assures that the nut will not be tilted as it is passed over the gaging wheels.

The base 52 may be secured to the sleeve 19 in which event the end of the nut is held against the end of the sleeve with the starting threads engaging the gaging wheels and a reading of the indicator is made. The frame member with its gaging wheels may then be pressed to the right through or relatively to the sleeve whereupon the gaging wheels traverse the internal threads and the indicator pointer will indicate any deviation of the thread from a master or perfect thread.

The gage may also be used as a hand gage to test the accuracy of a threaded hole in a large sized casting which cannot be readily moved. The gage is removed from the base 52 whereupon the gaging wheels are inserted into the threaded hole to be tested so that the end of the sleeve 19 abuts the face of the casting. The frame member is then pressed to the right or into the sleeve so that the gaging wheels enter the threaded hole and gage the accuracy of the thread therein. Any inaccuracy from a perfect thread will move the cooperating gaging wheel 29 radially and pivot the arm 31 which movement will be transmitted through the push pin 34 to the indicator. It will be noted that in these various manners of using the gage one of the members including the frame member and the sleeve member is mounted for axial movement with respect to the other member.

In the spline gage of FIGS. 5 and 6, the spline is applied over the gaging wheels until the end of the spline member abuts the end of the sleeve 19. The spline or the gage may then be rotated to test the accuracy of the flanks of the longitudinal ribs or ridges of the spline. The gaging wheels may be inserted farther into the spline hole by pressing the spline against the sleeve or by pushing the frame member to project the gaging wheels farther into the spline hole. Rotation of the spline or gage in this new position will then indicate any deviation of the spline at this second position. In this manner the gaging wheels may be brought into contact with the spline at any point throughout its length and the flanks of the spline ridges gaged throughout the length thereof. This gage too, may be mounted on a base secured to either the collar 11 or the sleeve 19 or may operate as a hand gage which is brought to the spline to be tested.

The wheel gage of FIGS. 7 and 8 is used similarly to the gage of FIGS. 1 and 2 with the gaging wheels 49 being inserted in the spline grooves which tests the accuracy of the depth of the grooves. By shifting the gage to other spline grooves, they may all be tested as to accuracy.

The gaging wheels of FIG. 7 may be substituted by gaging wheels as shown in FIGURE 4 having grooves the sides of which have an angle and are spaced apart so as to conform to the sides or flanks of a spline ridge or rib R to engage the sides or flanks of a rib. A wheel gage having two oppositely disposed such gaging wheels engages and gages the flanks of two ribs and by shifting the gaging wheels to each pair of oppositely disposed ribs, all of the ribs are gaged. A gage with three gaging wheels as illustrated in FIGURE 7, would gage the relative accuracy of three spline ridges. By shifting the gaging wheels to other spline ribs, all of the ribs may be gaged. Spacing the gaging wheels so that an external spline may pass between the gaging wheels as shown in FIG. 4a provides a gage for gaging external spline ribs. The gaging wheels 57 have angular sides conforming to the angle of the flanks of the spline rib and the angular sides are spaced apart to conform with the spacing of a master or perfect spline.

In the various constructions illustrated and described, the diameter of the end of the frame member at the sleeve may be approximately that of the internal diameter of the test part. The frame member then also serves as a guide for the test part when the test part is projected thereover. Such guide is particularly suitable for a gage having two oppositely mounted gaging wheels as in FIG. 3 and assures that the two gaging wheels are engaging across the diameter of the test part. The diameter of the end of the frame member may be made corresponding to the minimum diameter of the test part and serve also as a gage of this diameter. If the test part will not pass over the end of the frame member, the minimum diameter of the test part is too small.

It is clear that the gaging wheels may have peripheries of a full circumference or full circular or may have peripheries which provide less than a full circumference. The gaging wheel means having axles fixed in position as to the frame member may include one or more gaging wheels.

FIGURES 9 and 10 illustrate additions which may be made to the gages illustrated in FIGS. 1 to 8. In the gage of these latter figures, the face of the test part is pressed against the face of the sleeve member 19 in bringing the gaging wheels into contact with the surface to be gaged. Sometimes this face is not square with respect to the surface to be gaged. In order to avoid this factor in the test part, the sleeve member may carry a plurality of supporting means 55 angularly disposed on the sleeve member. These supporting means may be relatively short in length, are relatively short in width or peripheral dimension and are provided with a surface corresponding with the surface to be gaged. For example, in the supporting means particularly illustrated, an internal thread is to be gaged so that the surface may carry one or two threads for engagement with the internal thread. Three of such supporting means are illustrated. These supporting means are located in a region of the plane corresponding with the axes of the gaging wheels, that is this region may be in the plane, or on either side of this plane but adjacent thereto. In operation, the thread to be tested is threaded onto the supporting means after which the internal thread is gaged as described in connection with the gages of FIGURES 1, 2 and 3. For a smooth surfaced hole to be tested, it is merely slipped over the supporting means.

FIGURES 11 and 12 illustrate a gage adapted to gage larger diameters of internal surfaces and particularly shown for large diameter threads in that the gaging wheels have a periphery to engage an internal thread. The same parts of the gages previously described are similarly numbered. In this gage a frame member 10 carries a pair of angularly disposed pedestals 58. Each pedestal is secured to the frame member in any desirable manner that illustrated being a hole 59 which receives the end of the pedestal and the latter is secured in position by a locking screw 60. A gaging wheel is rotatably mounted on each of the pedestals. This pair of pedestals and wheels form gaging means. The gaging wheels illustrated are thread gaging wheels 25 and 26 in that they carry teeth for engaging a screw thread.

A third pedestal 63 is angularly disposed oppositely from the pedestals 58. This pedestal is suitably secured to the frame member 10 such as in a hole 64 and the pedestal is secured to the member by a locking screw 65. Slide means including a slide 66 is mounted on the pedestal 63 for radial movement and the slide means carries the gaging means or particularly a gaging wheel 29. In the construction particularly illustrated, the pedestal 63 is tubular and the slide is radially movable within the tubular pedestal. Means are provided to limit the radial movement of the slide, the limiting means particularly illustrated being a screw 67 threaded into the slide and passing through a slot 68 in the pedestal. The inner end of the slide means engages the arm 31 and through the arm operates the push pin 34 extending to the indicator.

The gaging wheels 25, 26 and 29 may be substituted by other gaging wheels depending on the surface being gaged. For a smooth surfaced hole the gaging wheels may be substituted by the gaging wheels 49. For gaging a spline the gaging wheels may be substituted by the spline gaging wheels 55 of FIG. 4 or 57 of FIG. 4a. For a spline gage such as shown in FIGS. 5 and 6, these spline wheels are substituted and similarly mounted as to their axes.

It is desirable that a position of the gaging wheel or means 29 be adjusted radially. This may be accomplished by lengthening the effective length of the slide means. This adjusting means as illustrated includes an adjusting screw 71 threaded into the end of the slide so that by turning the screw the relative length of the slide may be increased or decreased to adjust the relative length of the slide and of the gaging wheel. For convenient adjustment of the adjustment screw, a hole 72 extends through the arm 31 and a hole 73 extends through the frame member 10 so that a screw driver or wrench may be inserted through the holes for adjusting the screw. The arm 31 may carry a pair of spaced projections 74 which engage the adjusting screw. A slide, therefore, constitutes a part of the mounting means for the cooperating gaging wheel for rotation and for radial movement towards and away from the gaging wheel means formed by the gaging wheels 25 and 26.

The gage for large diameter surfaces may be used by passing the test piece with the internal surface to be gaged over the gaging wheels and any deviation from a proper size will move the gaging wheel 29 and the slide 66 radially to operate the arm 31 which in turn actuates the push pin 34 and any deviation is indicated on the indicator 13.

In order to assist in the gaging operation it is desirable that means be provided to aid in aligning the test part with the gaging elements. To this end, the sleeve member 19 may be provided with a plurality of pedestals 77 which may engage the end of the test part and in this manner aid in aligning the hole to be gaged with the gaging wheels. The pedestals are suitably secured to the sleeve member such as by screw thread 79. The test part engages the pedestal and axial pressure on the test part moves the pedestals 77 and sleeve member 19 against the pressure of the spring 22 shown in FIG. 1 and in this manner assists in aligning the test hole with the gaging wheels. Or the sleeve member may be held stationary and the frame member moved axially to run the gaging wheels the full length of the surface or thread as previously described.

With large diameter test pieces also, the end of the test part may not be square with the hole or internal thread to be tested so that it is desirable that the pedestals carry supporting means 78 having a surface conforming to that to be gaged. In the form illustrated for an internal screw thread the supporting means carries one or two threads to receive the internal thread to be gaged. These supporting means may be relatively short so that they engage a short depth of the internal surface and also have a relatively small width or peripheral dimension so that the gaging wheels may be turned to different angular positions and gage other portions of the test hole or thread. The supporting means also are located in the region of the plane of the axes of the gaging wheels that is in or approximately corresponding with the plane of the axes of the gaging wheels which axes correspond with the center axes of the axles or pins on which the wheels are mounted.

In gaging a large diameter internal thread, the end of the test part is placed against the supporting means and rotated so that the internal thread and the threads of the supporting means 78 are engaged. Axial movement of the test part then passes the gaging wheels over the internal surface or thread and by watching the indicator, the accuracy or any deviation of the test thread is determined. As previously explained the frame member and its gaging wheels may be moved axially to gage the internal surface of the test piece.

FIGURE 13 shows a modification of the construction of FIG. 3 in which the gaging wheels 38 and 40 are mounted on a single axle 82. The rest of the construction is the same as disclosed in other views. This gage is particularly intended for small diameters, internal holes or threads where space limitations are a factor. The gaging wheels are segmental or less than 180° of peripherial extent. This gage is of the go or not-go type, that is it does not carry an indicator for indicating any variations of the diameter of the internal thread from a master or perfect thread. If the gage wheels pass into the hole or thread the hole is not too small and any oversize can be determined by the shake or looseness of the gaging wheels in the hole.

FIGURE 14 shows a construction of wheel gage and particularly of a wheel gage for external screw threads. In this construction the gaging wheel means, using particularly a pair of gaging wheels 25 spaced about 120° apart, one of which is shown, has each gaging wheel mounted on an axle 85 carried by a projection or post 86 which is secured to the frame member 10. The cooperating gaging wheel 29 is rotatably mounted on an axle 87 carried by a gaging wheel arm 88. This arm is mounted on a pivot 89 carried by the frame member 10. The arm extends into a slot 90 in the end of the frame member. This mounting permits relatively radial movement of the cooperating gaging wheel 29 with respect to the gaging wheel means 25. The pivot 89 is on the opposite side of the push pin 34 with respect to the gaging wheel 29 so that any vertical outward movement of the gaging wheel 29 will press the push pin inwardly or to the left as shown in the figure which movement will be indicated upon an indicator and in this manner gage any variation in the test part or thread with respect to a perfect or master thread.

The gage for large sized internal holes is also portable in that it may be brought to a hole or internal thread in a large casting to gage the same. By providing pedestals of different heights, the gage may be adapted for internal surfaces of any dimension.

The invention is presented to fill a need for improvements in a wheel gage. It is understood that various modifications in structure, as well as changes in mode of operation, assembly and manner of use, may and often do occur to those skilled in the art, especially after benefiting from the teachings of an invention. Hence it will be understood that this disclosure is illustrative of preferred means of embodying the invention in useful form by explaining the construction, operation and advantages thereof.

What is claimed is:

1. A wheel gage to test a surface comprising a frame member having a longitudinal axis, gaging wheel means including at least one gaging wheel and an axle rotatably mounting said gaging wheel on the frame member, said gaging wheel having at least a portion of a generally circular periphery, a cooperating gaging wheel having at least a portion of a generally circular periphery, the peripheries of the gaging wheels being formed to gage the surface, a push pin slidably mounted in the frame member, mounting and connecting means mounting the cooperating gaging wheel oppositely from the gaging wheel means for rotation and for movement towards and away from the gaging wheel means and connecting the cooperating gaging wheel with the push pin to be actuated by the movement of this gaging wheel towards and away from the gaging wheel means, including an axle, and means carried by the frame member to receive an indicator in a position to be actuated by the push pin.

2. A wheel gage as in claim 1 in which the gaging wheel means includes a pair of gaging wheels mounted in spaced angular relation of less than 180°.

3. A wheel gage as in claim 1, including a sleeve member, and one of said members being slidably mounted on the other.

4. A wheel gage as in claim 1 in which the axle for rotatably mounting each gaging wheel has an axis, the axis of each axle being in a plane at right angles to the axis of the frame member.

5. A wheel gage for screw threads as in claim 4 in which the peripheries of the gaging wheels have teeth to gage a screw thread.

6. A wheel gage as in claim 1 in which the mounting and connecting means for the cooperating gaging wheel includes an arm, an arm pivot carried by the frame member to pivotally mount the arm thereon, the axle for the cooperating gaging wheel being operatively connected with the arm spaced from the arm pivot, and the push pin operatively engaging the arm.

7. A wheel gage as in claim 6 including a sleeve member, said members having an axis, one of said members being slidably mounted axially on the other.

8. An internal wheel gage as in claim 1 in which the peripheries of the gaging wheel means and the cooperating gaging wheel are full circular peripheries.

9. An internal wheel gage as in claim 1 in which the gaging wheel axles are spaced apart less than two gaging wheel radii and the gaging wheel peripheries are of less than 180° extent.

10. An internal wheel gage as in claim 9 including means connecting the two gaging wheels to maintain the gaging wheels initially in the same starting position.

11. An internal wheel gage is in claim 9 including gear teeth carried by the gaging wheels which intermesh without restricting radial movement of the cooperating gaging wheel over the gaging range.

12. An internal wheel gage as in claim 4 in which the periphery of each gaging wheel is grooved and the sides of the groove have an angle and are spaced apart to engage the flanks of a longitudinally extending spline rib.

13. An internal wheel gage as in claim 4 in which the peripheral portion of each gaging wheel is cylindrical to engage the root surfaces of a spline groove.

14. An internal wheel gages as in claim 3 including a plurality of supporting means of relatively short circumferential dimension carried by the sleeve member and spaced circumferentially thereon and each having an outer surface, the outer surfaces of the supporting means being located to engage the inner surface to be gaged and corresponding with the internal surface of the test part, each gaging wheel having an axis, the axes being in a plane at right angles to the longitudinal axis, and the supporting means being in the region of the plane.

15. An internal wheel gage as in claim 1 including a pedestal carried by the frame member for each gaging wheel of the gaging wheel means, a pedestal carried by the frame member for the cooperating gaging wheel, the mounting and connecting means for the cooperating gaging wheel including a slide carried by the pedestal and on which the cooperating gaging wheel is mounted and the slide being movable radially on the pedestal.

16. An internal wheel gage as in claim 15 including means carried by the slide to adjust the length thereof.

17. An internal wheel gage as in claim 15 in which the pedestal for the cooperating gaging wheel is tubular, and the slide is received within the tubular pedestal.

18. An internal wheel gage as in claim 17 including an adjusting screw carried by the end of the slide to adjust the length of the slide and the mounting means including a lever engaging the end of the adjusting screw.

19. An internal wheel gage as in claim 15 including a sleeve member, said members having an axis one of said members being slidably mounted axially on the other, a spring between the sleeve member and the frame member to propel one member axially with respect to the other member, a plurality of supporting means pedestals carried by the sleeve member angularly spaced from each other, supporting means carried by each supporting means pedestal located to engage the internal surface to be gaged and having a surface corresponding with the surface to be gaged, each gaging wheel having an axis and the axes being in a plane at right angles to the direction of movement of the movable member, and the supporting means being located in the region of the plane.

20. An external wheel gage as in claim 6 in which the pivot for the gaging wheel arm is carried on the frame member on the opposite side of the push pin with respect to the cooperating gaging wheel.

21. A wheel gage as in claim 1, said axle being parallel with the longitudinal axis of the frame member, said axle for the cooperating gaging wheel being generally parallel with the longitudinal axis of the frame member, the peripheries of the gaging wheels having teeth extending in the direction of the axes of its axles and formed to gage longitudinally extending spline ribs.

22. An internal wheel gage as in claim 14 in which the frame member includes a pedestal for each gaging wheel of the gaging wheel means, and a pedestal for the cooperating gaging wheel, the mounting and connecting means for the cooperating gaging wheel including a slide carried by the pedestal and on which the cooperating gaging wheel is mounted and the slide being movable radially on the pedestal, and in which each of the supporting means includes a pedestal upon which the supporting means is carried.

References Cited in the file of this patent
UNITED STATES PATENTS
2,597,644    Johnson _____ May 20, 1952